(12) United States Patent
Robinson et al.

(10) Patent No.: US 10,685,502 B2
(45) Date of Patent: Jun. 16, 2020

(54) TOLL FEE SYSTEM AND METHOD

(71) Applicant: ATS TOLLING LLC, Mesa, AZ (US)

(72) Inventors: Benjamin P. Robinson, Plano, TX (US); Debbie Lemon, Carrollton, TX (US)

(73) Assignee: ATS TOLLING LLC, Tempe, AZ (US)

( * ) Notice: Subject to any disclaimer, the term of this patent is extended or adjusted under 35 U.S.C. 154(b) by 918 days.

(21) Appl. No.: 13/894,501

(22) Filed: May 15, 2013

(65) Prior Publication Data

US 2013/0253997 A1 Sep. 26, 2013

Related U.S. Application Data

(63) Continuation of application No. 12/437,782, filed on May 8, 2009, now Pat. No. 8,473,333, which is a continuation of application No. 11/985,985, filed on Nov. 19, 2007, now Pat. No. 8,473,332, which is a
(Continued)

(51) Int. Cl.
*G06Q 10/00* (2012.01)
*G07B 15/06* (2011.01)
*G06Q 30/04* (2012.01)
*G07B 15/04* (2006.01)
*G06Q 20/10* (2012.01)
*G06Q 40/00* (2012.01)

(52) U.S. Cl.
CPC ......... *G07B 15/063* (2013.01); *G06Q 20/102* (2013.01); *G06Q 30/04* (2013.01); *G06Q 40/12* (2013.12); *G07B 15/04* (2013.01)

(58) Field of Classification Search
USPC .......... 705/13, 1.1, 7.11, 7.12, 63; 713/175, 713/156; 380/278, 59
See application file for complete search history.

(56) References Cited

U.S. PATENT DOCUMENTS

| 4,510,495 A | 4/1985 | Sigrimis et al. |
| 4,546,241 A | 10/1985 | Walton |
| 4,665,395 A | 5/1987 | Van Ness |

(Continued)

FOREIGN PATENT DOCUMENTS

| EP | 0780801 | 6/1997 |
| EP | 0780801 A1 | 6/1997 |

(Continued)

OTHER PUBLICATIONS

U.S. Appl. No. 13/737,272, Notice of Allowance, dated Mar. 6, 2017, 9 pages.
(Continued)

*Primary Examiner* — Akiba K Robinson
(74) *Attorney, Agent, or Firm* — Stoel Rives LLP

(57) ABSTRACT

A toll fee tracking system comprising a toll authority adapted to collect data associated with at least one toll fee tracking device and a toll rental entity adapted to communicate with the toll authority and a third part entity. This Abstract is provided to comply with rules requiring an Abstract that allows a searcher or other reader to quickly ascertain subject matter of the technical disclosure. This Abstract is submitted with the understanding that it will not be used to interpret or limit the scope or meaning of the claims.

24 Claims, 13 Drawing Sheets

Related U.S. Application Data continuation of application No. 11/125,521, filed on May 10, 2005, now Pat. No. 7,407,097.

(60) Provisional application No. 60/569,779, filed on May 10, 2004, provisional application No. 60/657,235, filed on Feb. 28, 2005.

(56) References Cited

U.S. PATENT DOCUMENTS

| | | |
|---|---|---|
| 5,086,389 A | 2/1992 | Hassett et al. |
| 5,263,118 A | 11/1993 | Cornelison |
| 5,310,999 A | 5/1994 | Claus et al. |
| 5,381,155 A | 1/1995 | Gerber |
| 5,396,417 A | 3/1995 | Burks et al. |
| 5,485,520 A | 1/1996 | Chaum et al. |
| 5,525,991 A | 6/1996 | Nagura et al. |
| 5,602,919 A | 2/1997 | Hurta |
| 5,642,419 A | 6/1997 | Rosen |
| 5,805,209 A | 9/1998 | Yuge et al. |
| 5,809,480 A | 9/1998 | Chasek |
| 5,819,234 A * | 10/1998 | Slavin .......... G07B 15/063 235/375 |
| 5,825,007 A | 10/1998 | Jesadanont et al. |
| D403,856 S | 1/1999 | Dobbins |
| 5,935,190 A | 8/1999 | Davis |
| 5,948,038 A | 9/1999 | Daly |
| 5,991,749 A | 11/1999 | Morrill, Jr. |
| 6,052,068 A | 4/2000 | Price R-W et al. |
| 6,087,963 A | 7/2000 | Kobayashi et al. |
| 6,111,523 A | 8/2000 | Mee |
| 6,163,277 A | 12/2000 | Gehlot |
| 6,175,800 B1 | 1/2001 | Mori et al. |
| 6,181,259 B1 | 1/2001 | Yamashita |
| 6,191,705 B1 | 2/2001 | Oomen et al. |
| 6,195,019 B1 | 2/2001 | Nagura |
| 6,198,913 B1 | 3/2001 | Sung et al. |
| 6,198,987 B1 | 3/2001 | Park et al. |
| 6,218,963 B1 | 4/2001 | Kawanabe et al. |
| 6,233,519 B1 | 5/2001 | Yamada |
| 6,243,029 B1 | 6/2001 | Tomer |
| 6,252,523 B1 | 6/2001 | Mostrom |
| 6,252,524 B1 | 6/2001 | Takikita |
| 6,275,552 B1 | 8/2001 | Ando |
| 6,278,935 B1 | 8/2001 | Kaplan et al. |
| 6,285,858 B1 | 9/2001 | Yoshida |
| 6,300,882 B1 | 10/2001 | Inoue |
| 6,308,893 B1 | 10/2001 | Waxelbaum et al. |
| 6,317,721 B1 | 11/2001 | Hurta et al. |
| 6,326,900 B2 | 12/2001 | DeLine et al. |
| 6,337,639 B1 | 1/2002 | Kojima |
| 6,340,934 B1 | 1/2002 | Hisada |
| 6,340,935 B1 | 1/2002 | Hall |
| 6,342,844 B1 | 1/2002 | Rozin |
| 6,344,806 B1 | 2/2002 | Katz |
| 6,347,739 B1 | 2/2002 | Tamam |
| 6,373,402 B1 | 4/2002 | Mee |
| 6,388,579 B1 | 5/2002 | Adcox et al. |
| 6,390,365 B1 | 5/2002 | Karasawa |
| 6,390,429 B1 | 5/2002 | Brincat |
| 6,396,418 B2 | 5/2002 | Naito |
| 6,411,889 B1 | 6/2002 | Mizunuma et al. |
| 6,437,706 B2 | 8/2002 | Sato et al. |
| 6,446,049 B1 | 9/2002 | Janning et al. |
| 6,449,555 B1 | 9/2002 | Ohba et al. |
| 6,459,385 B2 | 10/2002 | Yamashita |
| 6,463,384 B1 | 10/2002 | Kaplan et al. |
| 6,490,443 B1 | 12/2002 | Freeny, Jr. |
| 6,509,843 B1 | 1/2003 | Fuyama |
| 6,538,580 B2 | 3/2003 | Bostrom et al. |
| 6,542,815 B1 | 4/2003 | Ishizaki et al. |
| 6,546,119 B2 | 4/2003 | Ciolli et al. |
| 6,587,755 B1 | 7/2003 | Smith et al. |
| 6,603,406 B2 | 8/2003 | Jambhekar |
| 6,642,851 B2 | 11/2003 | Deline et al. |
| 6,653,946 B1 | 11/2003 | Hassett |
| 6,658,392 B2 | 12/2003 | Yoshida |
| 6,658,775 B1 | 12/2003 | Lanzisero |
| 6,661,352 B2 | 12/2003 | Tiernay et al. |
| 6,683,580 B2 | 1/2004 | Kuramoto |
| 6,683,956 B1 | 1/2004 | Aikawa et al. |
| 6,684,155 B1 | 1/2004 | Chen et al. |
| 6,705,521 B1 | 3/2004 | Wu et al. |
| 6,725,202 B1 | 4/2004 | Hurta et al. |
| 6,737,986 B2 | 5/2004 | Fuyama |
| 6,744,377 B1 | 6/2004 | Inoue |
| 6,754,369 B1 | 6/2004 | Sazawa |
| 6,756,915 B2 | 6/2004 | Choi |
| 6,774,810 B2 | 8/2004 | Deline |
| 6,791,475 B2 | 9/2004 | Yamashita |
| 6,796,499 B1 | 9/2004 | Wang |
| 6,816,707 B1 | 11/2004 | Barker et al. |
| 6,834,267 B1 | 12/2004 | Fuyama |
| 6,856,820 B1 | 2/2005 | Kolls |
| 6,883,710 B2 | 4/2005 | Chung |
| D505,916 S | 6/2005 | Hilton |
| 6,909,876 B2 | 6/2005 | Higashino et al. |
| 6,920,379 B2 | 7/2005 | Miyamoto |
| 6,937,162 B2 | 8/2005 | Tokitsu et al. |
| 6,985,827 B2 | 1/2006 | Williams et al. |
| 7,019,670 B2 | 3/2006 | Bahar |
| 7,053,793 B2 | 5/2006 | Tajima et al. |
| 7,080,070 B1 | 7/2006 | Gavarini |
| 7,104,447 B1 | 9/2006 | Lopez et al. |
| D535,722 S | 1/2007 | Nimberger |
| 7,970,644 B2 | 6/2011 | Hedley et al. |
| 8,363,899 B2 | 1/2013 | Balachandran |
| D704,243 S | 5/2014 | Ikegame |
| D728,481 S | 5/2015 | Schulte |
| 2001/0019307 A1 | 9/2001 | Sato et al. |
| 2001/0025251 A1 | 9/2001 | Konishi et al. |
| 2001/0026228 A1 | 10/2001 | Naito |
| 2001/0052880 A1 | 12/2001 | Kuramoto |
| 2002/0002534 A1* | 1/2002 | Davis .............. G06Q 20/04 705/39 |
| 2002/0004741 A1 | 1/2002 | Yoshida |
| 2002/0008638 A1 | 1/2002 | Yamashita |
| 2002/0018005 A1 | 2/2002 | Fuyama |
| 2002/0032506 A1 | 3/2002 | Tokitsu et al. |
| 2002/0046128 A1 | 4/2002 | Abe et al. |
| 2002/0052837 A1 | 5/2002 | Bouthors |
| 2002/0067291 A1 | 6/2002 | Ikeda |
| 2002/0072963 A1 | 6/2002 | Jonge |
| 2002/0080048 A1 | 6/2002 | Choi |
| 2002/0089431 A1 | 7/2002 | Fuyama |
| 2002/0097178 A1* | 7/2002 | Thomas, Jr. ........ G06Q 30/04 342/47 |
| 2002/0105440 A1 | 8/2002 | Bostrom et al. |
| 2002/0111851 A1 | 8/2002 | Folkers |
| 2002/0115410 A1 | 8/2002 | Higashino et al. |
| 2002/0145039 A1 | 10/2002 | Carroll |
| 2002/0145542 A1 | 10/2002 | Yamashita |
| 2002/0178050 A1 | 11/2002 | Sone |
| 2002/0186144 A1 | 12/2002 | Meunier |
| 2002/0194137 A1 | 12/2002 | Park et al. |
| 2002/0198767 A1 | 12/2002 | Kim |
| 2003/0001755 A1 | 1/2003 | Tiernay et al. |
| 2003/0026430 A1 | 2/2003 | Aikawa et al. |
| 2003/0033083 A1 | 2/2003 | Nakashima et al. |
| 2003/0046145 A1 | 3/2003 | Miao |
| 2003/0050038 A1 | 3/2003 | Haave et al. |
| 2003/0067396 A1 | 4/2003 | Hassett |
| 2003/0069784 A1 | 4/2003 | Banerjee et al. |
| 2003/0098800 A1 | 5/2003 | Jambhekar et al. |
| 2003/0105662 A1 | 6/2003 | Koketsu et al. |
| 2003/0109223 A1 | 6/2003 | Toyama |
| 2003/0110075 A1 | 6/2003 | Shioda et al. |
| 2003/0112125 A1 | 6/2003 | Saegrov |
| 2003/0115095 A1 | 6/2003 | Yamauchi |
| 2003/0125981 A1 | 7/2003 | Pedrazzoli Pazos |
| 2003/0189498 A1 | 10/2003 | Kakihara et al. |
| 2003/0200227 A1 | 10/2003 | Ressler |
| 2004/0004120 A1 | 1/2004 | Kojima |
| 2004/0008514 A1 | 1/2004 | Lee et al. |

(56) References Cited

U.S. PATENT DOCUMENTS

| | | |
|---|---|---|
| 2004/0019412 A1 | 1/2004 | Miyamoto |
| 2004/0046019 A1 | 3/2004 | Kojima |
| 2004/0068433 A1 | 4/2004 | Chatterjee et al. |
| 2004/0083130 A1 | 4/2004 | Posner et al. |
| 2004/0140355 A1 | 7/2004 | Grison |
| 2004/0146272 A1 | 7/2004 | Kessel et al. |
| 2004/0153401 A1 | 8/2004 | Gila et al. |
| 2004/0161097 A1 | 8/2004 | Henry |
| 2004/0162788 A1 | 8/2004 | Sakamoto |
| 2004/0174272 A1 | 9/2004 | Lin |
| 2004/0178929 A1 | 9/2004 | Toyama |
| 2004/0206817 A1 | 10/2004 | Grant |
| 2004/0212518 A1 | 10/2004 | Tajima et al. |
| 2004/0227616 A1 | 11/2004 | Lafferty |
| 2004/0236685 A1 | 11/2004 | Gila |
| 2004/0245302 A1 | 12/2004 | McNicholas |
| 2004/0263356 A1 | 12/2004 | Wu et al. |
| 2004/0266500 A1 | 12/2004 | Gila et al. |
| 2005/0005488 A1 | 1/2005 | Burke |
| 2005/0010478 A1 | 1/2005 | Gravelle |
| 2005/0033505 A1 | 2/2005 | Zatz |
| 2005/0034340 A1 | 2/2005 | Burke |
| 2005/0040221 A1 | 2/2005 | Schwarz, Jr. |
| 2005/0071175 A1 | 3/2005 | Gila et al. |
| 2005/0075836 A1 | 4/2005 | Taylor |
| 2005/0086100 A1 | 4/2005 | Yanagisawa et al. |
| 2005/0097018 A1 | 5/2005 | Takida |
| 2005/0102211 A1 | 5/2005 | Freeny |
| 2005/0116838 A1 | 6/2005 | Bachelder et al. |
| 2005/0119010 A1 | 6/2005 | Yasukawa |
| 2005/0157677 A1 | 7/2005 | Dowling |
| 2005/0159133 A1 | 7/2005 | Hasan et al. |
| 2005/0168351 A1 | 8/2005 | Saze et al. |
| 2005/0168352 A1 | 8/2005 | Tomer |
| 2005/0169227 A1 | 8/2005 | Dowling |
| 2005/0169228 A1 | 8/2005 | Dowling |
| 2005/0170824 A1 | 8/2005 | Dowling |
| 2005/0170825 A1 | 8/2005 | Dowling |
| 2005/0179522 A1 | 8/2005 | Saegrov |
| 2005/0187701 A1 | 8/2005 | Baney |
| 2005/0195841 A1 | 9/2005 | Dowling |
| 2005/0195842 A1 | 9/2005 | Dowling |
| 2005/0197976 A1* | 9/2005 | Tuton ............... G06Q 30/0284 705/417 |
| 2005/0198199 A1 | 9/2005 | Dowling |
| 2005/0203892 A1 | 9/2005 | Wesley et al. |
| 2005/0216187 A1 | 9/2005 | Hartinger |
| 2005/0270178 A1 | 12/2005 | Ioli |
| 2005/0279831 A1 | 12/2005 | Robinson et al. |
| 2006/0041513 A1 | 2/2006 | Yuhara et al. |
| 2006/0143104 A1 | 6/2006 | Wagonheim |
| 2006/0237528 A1 | 10/2006 | Bishop et al. |
| 2006/0289621 A1 | 12/2006 | Foss et al. |
| 2007/0026842 A1 | 2/2007 | Haave et al. |
| 2007/0100745 A1 | 5/2007 | Keiser et al. |
| 2007/0124197 A1 | 5/2007 | Robinson et al. |
| 2007/0124198 A1 | 5/2007 | Robinson et al. |
| 2007/0124199 A1 | 5/2007 | Robinson et al. |
| 2007/0126601 A1 | 6/2007 | Park |
| 2007/0192177 A1 | 8/2007 | Robinson et al. |
| 2007/0252678 A1 | 11/2007 | Garcia Alonso et al. |
| 2007/0299721 A1 | 12/2007 | Robinson et al. |
| 2008/0040210 A1 | 2/2008 | Hedley |
| 2008/0062009 A1 | 3/2008 | Marton |
| 2008/0062472 A1 | 3/2008 | Garg et al. |
| 2008/0077417 A1 | 3/2008 | Lazzarino et al. |
| 2008/0248819 A1 | 10/2008 | Smith et al. |
| 2008/0249936 A1 | 10/2008 | Miller et al. |
| 2008/0270226 A1 | 10/2008 | Archibald |
| 2009/0089156 A1 | 4/2009 | Robinson et al. |
| 2009/0146845 A1 | 6/2009 | Hedley |
| 2009/0195651 A1 | 8/2009 | Leonard et al. |
| 2009/0228350 A1 | 9/2009 | Robinson et al. |
| 2010/0023452 A1 | 1/2010 | Brown |
| 2014/0117096 A1 | 5/2014 | Heimlicher |
| 2014/0149190 A1 | 5/2014 | Robinson et al. |
| 2014/0244492 A1 | 8/2014 | Balachandran |
| 2014/0289024 A1 | 9/2014 | Robinson et al. |
| 2016/0125665 A1 | 5/2016 | Robinson et al. |

FOREIGN PATENT DOCUMENTS

| | | |
|---|---|---|
| EP | 0784297 A2 | 7/1997 |
| EP | 0784297 A2 | 7/1997 |
| GB | 2414336A A | 11/2005 |
| JP | 2004213569 A | 7/2004 |
| JP | 2004227259 A | 8/2004 |
| WO | WO-2007044960 A2 | 4/2007 |

OTHER PUBLICATIONS

U.S. Appl. No. 14/471,300, Non-Final Office Action, dated Apr. 21, 2017, 22 pages.

U.S. Appl. No. 14/268,357, Non-Final Office Action, dated May 31, 2017, 16 pages.

U.S. Appl. No. 14/244,023, Non-Final Office Action, dated Sep. 14, 2017, 21 pages.

Edge, "Electronic toll collection: AT&T to install system in California", vol. 8, No. 248, Apr. 26, 1993.

U.S. Appl. No. 14/268,357, Final Office Action, dated Sep. 25, 2017, 23 pages.

PCT/US2006/034534, International Search Report and Written Opinion, dated Sep. 18, 2007, 6 pages.

U.S. Appl. No. 13/737,272, Non-Final Office Action, dated Oct. 7, 2014, 20 pages.

U.S. Appl. No. 13/737,272, Final Office Action, dated Apr. 27, 2016, 7 pages.

U.S. Appl. No. 13/737,272, Final Office Action, dated Feb. 10, 2015, 7 pages.

U.S. Appl. No. 13/737,272, Non-Final Office Action, dated Oct. 28, 2015, 6 pages.

U.S. Appl. No. 14/471,300, Final Office Action, dated Oct. 16, 2017, 33 pages.

"Overview of Meeting Proceedings", 2004 IBTTA Technology Committee, Spring Technology Workshop, Miami, Florida, USA, (4 pages).

Dick Schnacke, "The 5.9 GHZ DSRC Prototype Development Program", IBTTA Technology Workshop, Madrid, Spain, Nov. 14, 2004, (37 pages).

Mehmood, Jennifer, "International Search Report for PCT/US2007/011816" dated Jun. 2, 2008 (3 pages).

Young, Lee W." International Search Report for PCT/US08/10258 " dated Nov. 10, 2008 (3 pages).

Copenheaver, Blaine R., "International Search Report" for PCT/US2009/060352 dated Dec. 10, 2009, (4 pages).

Fernandez, Paneda, J., "Supplementary European Search Report" , dated Nov. 5, 2009, (4 pages).

Astarita, Vittorio et al., "The use of Mobile Phones in Traffic Management and Contol", 2001 IEEE Intelligent Transportation Systems Conference Proceedings, Oakland, CA, Aug. 25-29, 2001, pp. 10-15.

"Toll Ring System; Oslo, Norway", www.eltis.org/studies/leda17.htm; retrieved Dec. 27, 2002 using archive.org., 4 pages.

Yee, Sonya, "Iron Curtain Still Bars the Road East", Oct. 19, 1998, European, p18, pp. 1-4.

ProQuest, "Dollar and Thrifty Keep Customers Moving with Pass24(TM)", PR Newswire, New York, Sep. 18, 2006, 2 pages.

U.S. Appl. No. 14/994,524, Notice of Allowance, dated Oct. 18, 2018, 9 pages.

IBM Corp.; "Introduction to Replication and Event Publishing"; IBM Information Integration, Version 9.5; 2004; 68 pages.

Connors, Jim, et al.; "Security Increases with Season for Shoplifting"; St. Joseph News; St. Joseph, MO; Nov. 30, 2005; 2 pages.

U.S. Appl. No. 14/471,300, Non-Final Office Action, dated Jul. 10, 2018, 29 pages.

U.S. Appl. No. 11/516,380, Robinson et al.

U.S. Appl. No. 11/516,376, Robinson.

U.S. Appl. No. 11/651,414, Robinson et al.

(56) References Cited

OTHER PUBLICATIONS

U.S. Appl. No. 11/580,527, Robinson.
U.S. Appl. No. 11/810,751, Robinson et al.
U.S. Appl. No. 11/640,550, Robinson et al.
U.S. Appl. No. 11/640,586, Robinson et al.
U.S. Appl. No. 11/803,933, Robinson et al.
U.S. Appl. No. 11/810,752, Robinson et al.
U.S. Appl. No. 11/985,985, Robinson et al.
U.S. Appl. No. 11/903,687, Robinson et al.
U.S. Appl. No. 12/268,680, Balachandran et al.
U.S. Appl. No. 12/437,621, Robinson et al.
U.S. Appl. No. 12/433,954, Robinson et al.
U.S. Appl. No. 12/433,479, Robinson et al.
U.S. Appl. No. 12/437,782, Robinson et al.
U.S. Appl. No. 13/737,272, Robinson et al.
U.S. Appl. No. 13/714,961, Balachandran.
* R7* Copenheaver, Blaine R., "International Search Report" for PCT/US2009/060352 dated Dec. 10, 2009, (4 pages).
U.S. Appl. No. 14/244,023, Final Office Action, dated Apr. 10, 2018, 21 pages.
U.S. Appl. No. 15/616,816, Non-Final Office Action, dated Aug. 14, 2019, 22 pages.
U.S. Appl. No. 15/616,816, Final Office Action, dated Janaury 15, 2020, 31 pages.

* cited by examiner

TOLL FEE SYSTEM AND METHOD

CROSS-REFERENCE TO RELATED APPLICATIONS

This application is a continuation of and claims priority from U.S. patent application Ser. No. 12/437,782, titled Toll Fee System And Method, filed on May 8, 2009. U.S. patent application Ser. No. 12/437,782 is a continuation of and claims priority from U.S. patent application Ser. No. 11/985,985, titled Toll Fee System And Method, filed on Nov. 19, 2007. U.S. patent application Ser. No. 11/985,985 is a continuation of and claims priority from U.S. patent application Ser. No. 11/125,521, titled Toll Fee System And Method, filed on May 10, 2005 now U.S. Pat. No. 7,407,097. U.S. patent application Ser. No. 11/125,521 claims priority from and incorporates by reference the entire disclosure of U.S. Provisional Patent Application No. 60/569,779, which was filed on May 10, 2004. U.S. patent application Ser. No. 11/125,521 further claims priority from and incorporates by reference the entire disclosure of U.S. Provisional Patent Application No. 60/657,235, which was filed on Feb. 28, 2005. U.S. patent application Ser. No. 12/437,782, U.S. patent application Ser. No. 11/985,985, U.S. Pat. No. 7,047,097, U.S. Provisional Patent Application No. 60/569,779, and U.S. Provisional Patent Application No. 60/657,235 are incorporated herein by reference.

BACKGROUND OF THE INVENTION

1. Technical Field

The present invention relates generally to toll fee tracking systems and methods and, more particularly, but not by way of limitation, to toll fee tracking systems and methods for automatic, non-contact, high-speed toll fee tracking of vehicular tolls associated with a toll tracking device used by vehicle operators.

2. History of Related Art

The crowding of highways within metropolitan areas has resulted in the development of additional traffic arteries known as toll roads. Toll roads have become increasingly popular, however, they require the payment of a toll fee for use by vehicular occupants. The collection of tolls by conventional means has had a negative effect upon highway throughput and safety. Congestion and long backups on toll plazas are becoming more common. Such conditions involve a significant economic cost, through lost time and reduced productivity. Moreover, serious accidents at toll plazas, caused by operators or mechanical failures, have also increased in frequency.

Certain toll authorities have attempted to respond to these problems by providing coin-operated toll collection devices, or by instituting a toll-plate system in which toll-takers visually inspect each incoming vehicle for an appropriate toll plate or sticker. Coin operated toll collection systems, however, do little to increase throughput, and are susceptible to fraud through the use of counterfeit coins. Toll-plate systems suffer the same deficiencies, requiring each vehicle to slow sharply while entering the visual inspection area. In later years, a development ensued that revolutionized toll road travel. This was the development of the toll fee tracking device.

One example of a toll fee tracking device is set forth and shown in U.S. Pat. No. 4,546,241 issued Oct. 8, 1985. This patent relates to an electronic identification and recognition system that includes a portable card having a circuit therein for generating and transmitting an identifying signal. The identifying signal includes predetermined frequency pulses. The card functions in cooperation with a reader which radiates a radio frequency carrier signal received by an antenna in the card. This signal is used both to power the circuit of the card and to provide the basic frequency signal which is modified to generate secondary frequency signals which are transmitted back to the reader in a predetermined sequence identifying the card.

Today, those individuals who frequently use toll roads are now prone to the purchase of toll fee tracking device. The toll fee tracking device allows the vehicular occupant to bypass the cash only toll gate and, in many instances, the vehicle can maintain its normal speed as it traverses the toll gate wherein the passage of the toll fee tracking device is recorded. The popularity of the toll fee tracking device has expanded to the point that the normal user of the toll fee tracking device can be frustrated by the lines at toll gates when the toll fee tracking device is not available. Unavailability of a toll fee tracking device can be for numerous reasons, not the least of which is the use of rental cars.

The rental car business is worldwide and continually expanding. Toll fee tracking devices are not, however, as known to the inventors hereof, available in rental cars. This is due, at least in part, to the fact that the charges for the toll fee tracking device are not typically generated in a manner allowing billing of the toll fee tracking device event during the duration of some car rentals. Typically toll fee tracking device invoices are delivered on a monthly basis while the toll fee data is not processed in a real-time. For business travelers, paying tolls in a rental car usually involves waiting at a toll gate with a live operator so that a receipt may be generated for later expense report purposes. Monthly toll fee invoices to car rental agencies reflecting use of a toll fee tracking device in a given vehicle over a period of time would inherently create a plethora of problems, not the least of which would be collection of toll fees by a vehicle renter who has long since turned in his or her expense report. Moreover, the current economic system for rental agencies typically requires that the entire financial transaction be completed at the time of turning in the rental car, unless some damage has occurred relative to the use thereof. Therefore, there is a need for a method and system facilitating use of, and financial accountability for, a toll fee tracking device used by vehicle operators such as, for example, rental car users.

SUMMARY OF THE INVENTION

A toll fee tracking system comprising a toll authority adapted to collect data associated with at least one toll fee tracking device and a toll rental entity adapted to communicate with the toll authority and a third part entity.

A method for toll fee tracking, the method comprising collecting, at a toll authority, data associated with at least one toll fee tracking device. The method further includes storing the data in at least one database of the toll authority and communicating, via a toll rental entity, the data to a third party entity.

A toll rental entity server for communicating data between a toll authority and a third party entity, the server comprising a first interface for communicating with the toll authority. The server further includes at least one database and a second interface for communicating with the third party entity. The communication between said toll authority and the third party entity occurs in real-time or near real-time.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
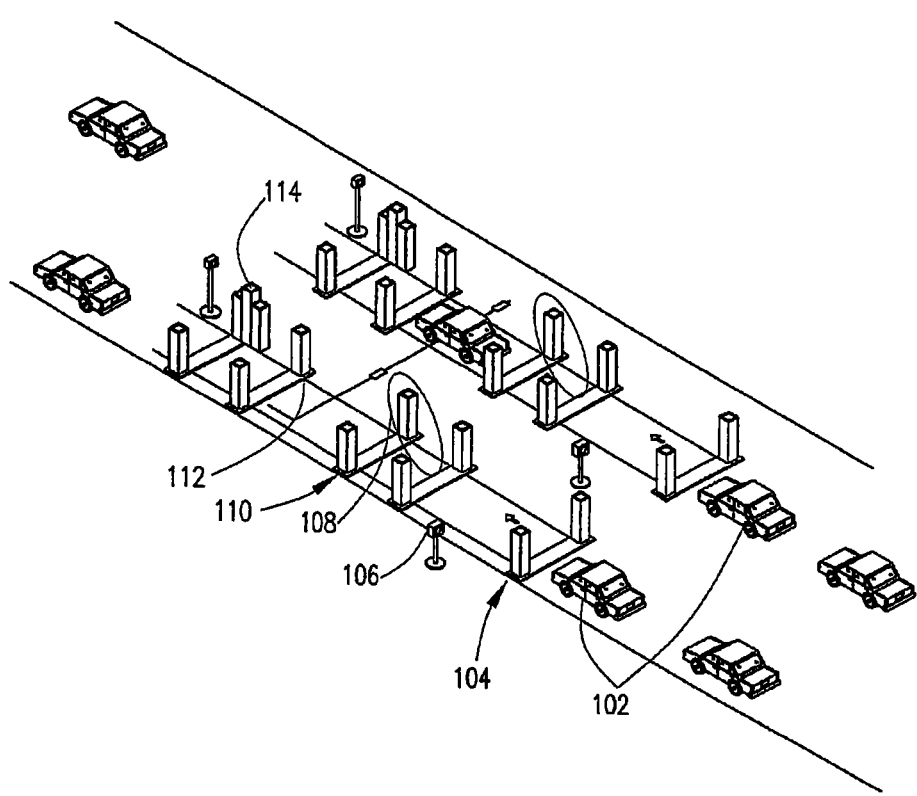
FIG. 1 is a perspective view illustrating an exit of a toll road in which an automatic toll collection system is installed.

FIG. 1 illustrates two Electronic Toll Collection (ETC) lanes 102. In each of the ETC lanes 102, tolls are automatically collected from each vehicle along the lanes 102 through radio communication between a toll fee tracking device (e.g., a radio frequency integrated device (RFID) transponder) installed in the vehicle and a toll collection unit installed on each ETC lane 102. The toll collection units are typically owned by a toll authority and are situated on toll authority property. Those skilled in the art will appreciate that the invention can be practiced in connection with roadways having additional lanes, including multi-lane divided highways, bridges, and tunnels. As one skilled in the art will appreciate the invention can also be practiced in connection with numerous other transport systems such as, for example, railways and waterways.

On each ETC lane 102, a vehicle type identifying device 104, a license plate monitor camera 106, an antenna 108, a vehicle detector 110, and a display 112 are arranged. The vehicle type identifying device 104 identifies the type of a vehicle passing thereby. The license plate monitor camera 106 captures an image of a license plate of the vehicle to read a license plate number out of the image. The vehicle detector 110 may be, for example, a photoelectric cell for optically sensing the presence of a vehicle and generating a VEHICLE PRESENT signal.

Figure 2:
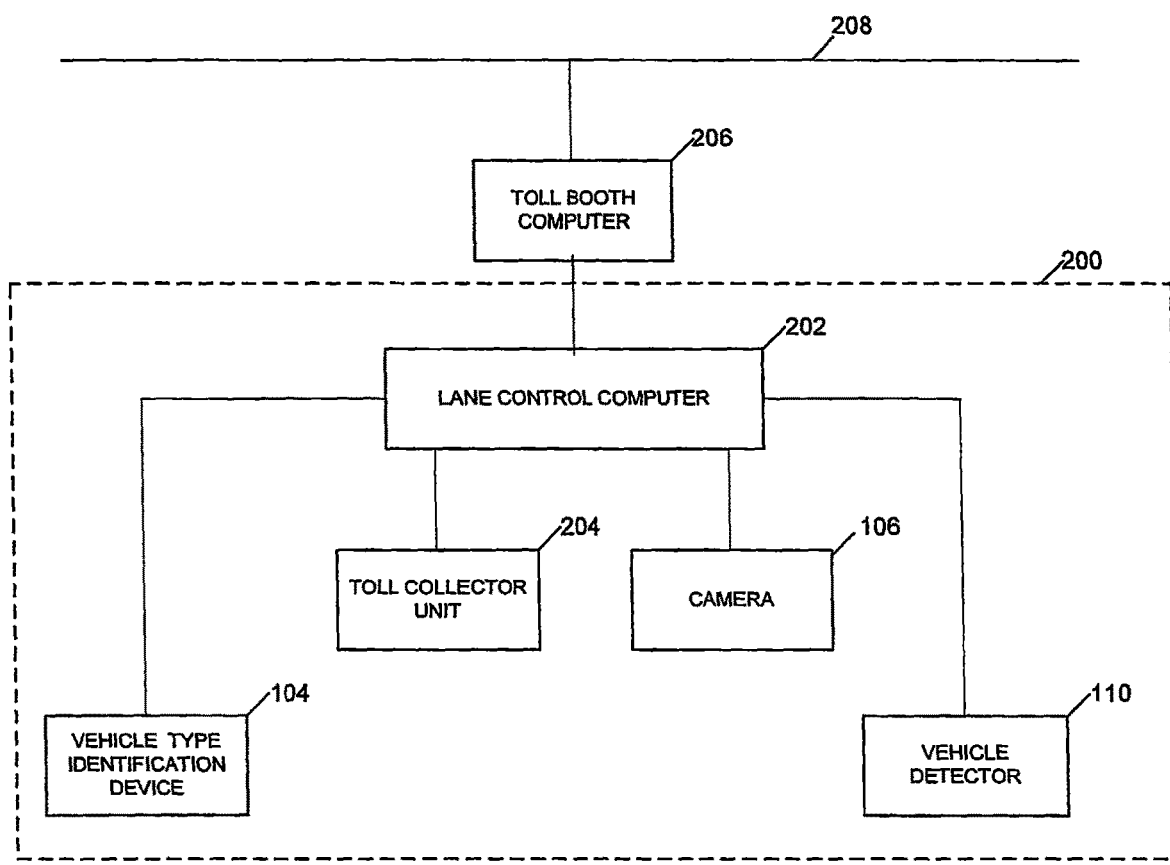
FIG. 2 illustrates a control device installed on an electronic toll collection lane.

The automatic toll collection system includes a control device 200, as shown in FIG. 2, one for each ETC lane 102. The control device 200 has a lane control computer 202 which controls operations of the vehicle type identifying device 104, the license plate monitor camera 106, and a toll collecting unit 204. The control device 200 receives information signals from the vehicle detector 110 indicating the passing of the vehicle. The lane control computer communicates with a toll booth computer 206. The toll booth computer 206 communicates with a network 208 for transmission of information.

Figure 3:
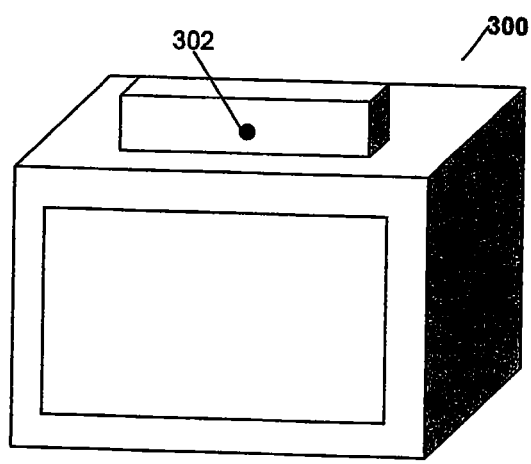
FIG. 3 illustrates an electronic toll fee tracking device installed in each vehicle.

FIG. 3 illustrates a toll fee tracking device 300 installed in each vehicle passing through either of the ETC lanes 102. As an exemplary embodiment, a radio frequency integrated device (RFID) transponder is utilized as the toll fee tracking device 300. Each vehicle is identified using the RFID transponder 300. The RFID transponder 300 includes a microchip attached to an antenna 302. The antenna 302 may be, for example, incorporated into the transponder 300 itself or a receptacle may be provided to attach to a conventional window mounted antenna, similar to those employed in connection with cellular telephone devices. The microchip contains information that identifies a particular toll rental entity account with a toll authority account. Each RFID transponder 300 is identified by a unique identification number (e.g., transponder Id). The RFID transponder 300 further includes circuitry for establishing a radio communication between the RFID transponder 300 and the toll collecting unit through the antenna 302.

Figure 4:
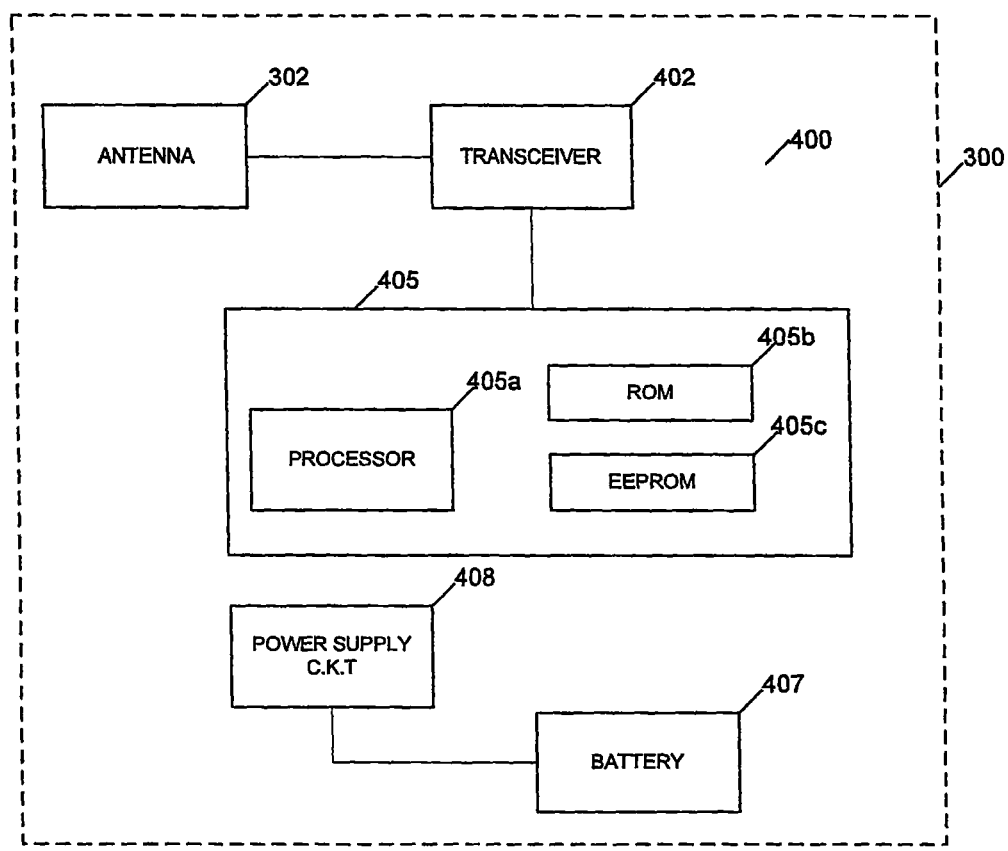
FIG. 4 illustrates a schematic block diagram of the toll fee tracking device.

FIG. 4 illustrates a schematic block diagram 400 of the toll fee tracking device 300 (i.e., the transponder) as illustrated in FIG. 3. The transponder 300 includes an antenna 302, a transceiver 402, and a control circuit 405. The transceiver 402 establishes radio communications between the transponder 300 and the toll collection unit 204 (FIG. 2) through the antenna 302. The control circuit 405 further includes a processor 405a, a mask ROM 405b, and an EEPROM 405c. The processor 405a performs the various programs stored in the mask ROM 405b. The EEPROM 405c stores therein transponder identification number and status data. The processor 405a may be, for example, an 8086 microprocessor or an 8051 microcontroller, or any other processor capable of executing the functions described above.

The transponder 300 may also includes a battery 407 and a power supply circuit 408. The power supply circuit 408 supplies power to the components of the transponder 300. For exemplary purposes, a transponder 300 powered by a battery 407 is shown. The RFID transponder 300 may be, for example, an active transponder or a passive transponder. Passive transponders do not require a battery to derive power for operation. Passive transponders derive power to operate from the electric field generated by the passive transponder. In addition, passive transponders are long lasting and support multiple frequency ranges. However, active transponders have a battery for deriving power for operation and support only one frequency. According to exemplary embodiments of the present invention, the RFID transponder 300 may be placed on interior region of the vehicle, for example, on a windshield of the vehicle. According to other exemplary embodiments of the present invention, the RFID transponder 300 may be placed on an exterior region of the vehicle, for example, on the roof or the license plate of the vehicle.

Figure 5A:
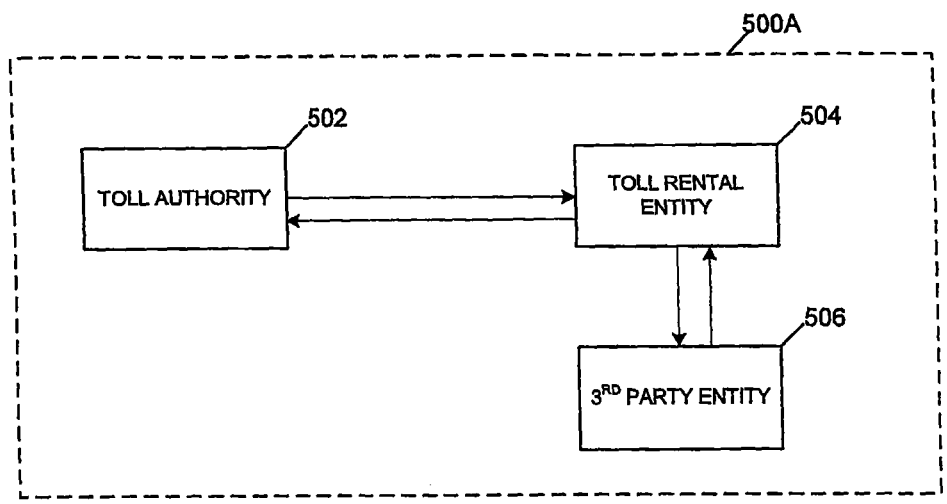
FIG. 5A illustrates a block diagram of a toll fee system in accordance with an embodiment of the present invention.

FIG. 5A illustrates a block diagram 500A of a toll fee system in accordance with an embodiment of the present invention. The system 500A includes a toll authority 502, a toll rental entity 504, and a third party entity 506. The toll rental entity 504 interfaces with both a toll authority 502 and a third party entity 506. When a vehicle having a valid RFID transponder 300 passes through a toll gate of the toll authority 502, the transponder 300 is read by the toll gate of the toll authority 502. The toll authority 502 collects data such as an identifier and toll fee assessed and allows access to at least a subset of the toll data. The toll rental entity 504 or the third party entity 506 that utilizes the toll rental entity 504 within the third party entity's 506 existing system may access at least a subset of the data collected by the toll authority 502. The data which includes information related to the fee charged to a particular transponder 300 may be passed from the toll rental entity 502 to the third party entity 504 in real-time or near real-time such that the vehicle operators are charged for any toll related charges. The vehicle operator may be, for example, a rental vehicle operator, an operator of a leased vehicle or the like. In short, the toll rental entity 504 acts as a communication channel between the toll authority 502 and the third party entity 506 for forwarding data from the toll authority 502 to the third party entity 506 in a real-time or near real-time fashion.

Figure 5B:
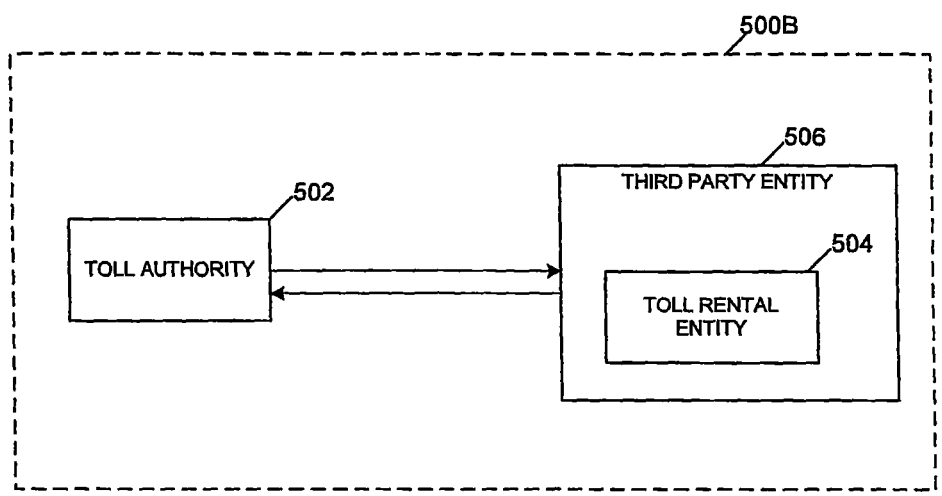
FIG. 5B illustrates a block diagram of a toll fee system in accordance with an alternate embodiment of the present invention.

FIG. 5B illustrates an alternate embodiment of the toll fee system 500B in accordance with an alternate embodiment of the present invention. The toll rental entity 504 may be integrated into an existing operating system of the third party entity 506. The third party entity 506 may request data directly from the toll authority 502. The third party entity 506 then utilizes the toll rental entity 504 to store data and reconcile accounts in a similar manner as that noted above with respect to FIG. 5A with the exception of transmitting and requesting data between the stand-alone toll rental entity 504 and the third party entity 606.

Figure 5C:
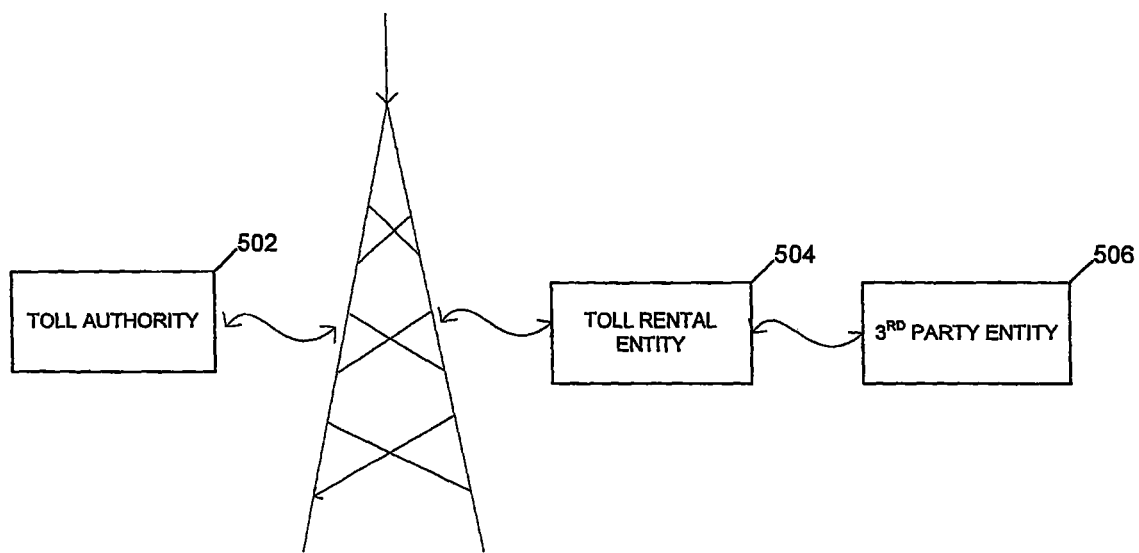
FIG. 5C illustrates a block diagram of a wireless system utilized in conjunction with the present invention.

FIG. 5C illustrates a block diagram of a wireless system utilized in conjunction with the present invention. Although all portions of the system of FIGS. 5C and 5D (described in detail below) are shown communicating via wireless links, it will understood by one skilled in the art that one or more portions of the system may be communicated via a wired network or other technology. In a similar manner to that of FIGS. 5A and 5B, communications between the toll authority 502, toll rental entity 504, and the third party entity 506 may be communicated via a request and response scenario, or via a push/pull scenario. In both scenarios, the data may be requested or sent in real-time or at some predefined regular intervals.

Referring to FIG. 5C, the toll rental entity 504 may request and pull data from the toll authority 502 via a wireless link. In an alternate embodiment, the toll authority 502 may push/transmit data from the toll authority 502 to the toll rental entity 504. The toll rental entity 504 may then transmit the data to the third party entity 506. In an alternate embodiment, the third party entity 506 may request specific data from the toll rental entity 504, which may thereafter transmit the requested data to the third party entity 506.

Figure 5D:
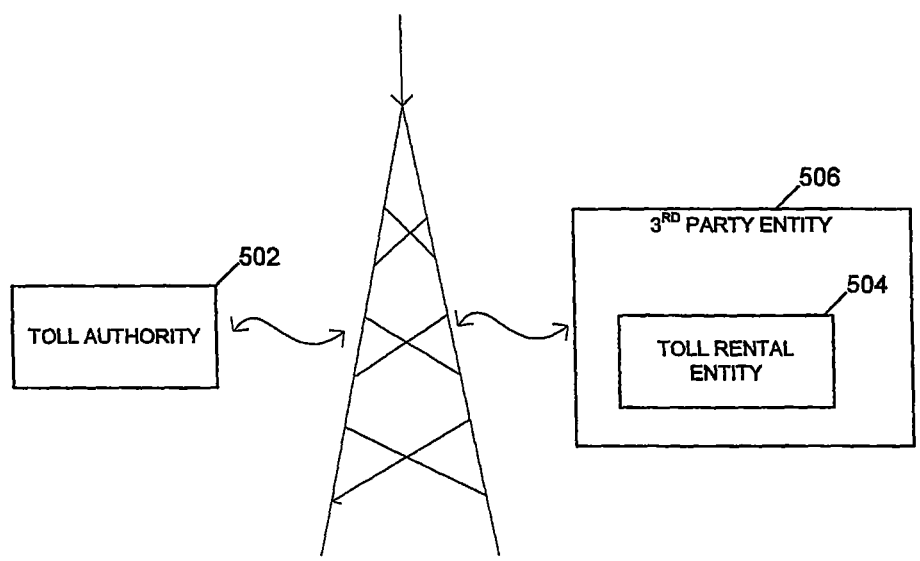
FIG. 5D illustrates a block diagram of a wireless system utilized in conjunction with an alternate embodiment of the present invention.

FIG. 5D illustrates a block diagram of a wireless system utilized in conjunction with an alternate embodiment of the present invention. As noted above with respect to FIG. 5C, toll data may be requested and pulled from the toll authority 502 by the toll rental entity 504. Alternatively, the toll authority 502 may push the toll data to the toll rental entity 504. The toll rental entity 504 may then transmit the data to the third party entity 506 to perform other operations such as, for example, billing, account reconciliation etc. Some or all the communications between the toll authority 502, and the toll rental entity 504 and/or third party entity 506 may be via, for example, a wireless telecommunications network, wired networks, or other technology.

Figure 6A:
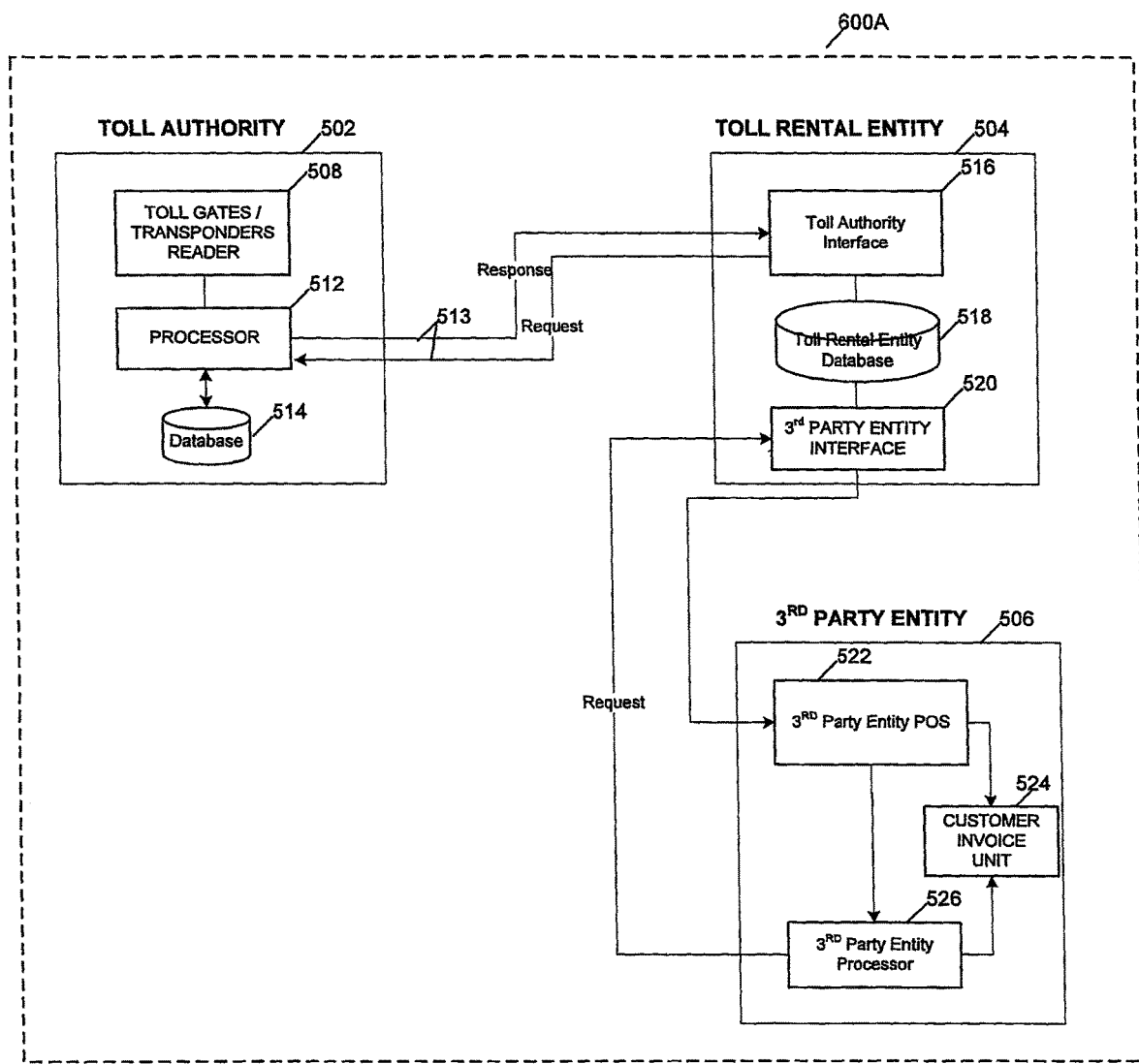
FIG. 6A illustrates a detailed block diagram of a toll fee system in accordance with an embodiment of the present invention.

FIG. 6A illustrates a detailed block diagram of a toll fee system 600A in accordance with an embodiment of the present invention. The toll fee system 600A provides information and records for accurate accounting of traffic activity and toll transactions for all transponders 300 having valid toll rental entity accounts. The toll fee system 600A performs various tasks such as, for example, monitoring toll collection, transferring toll collection data to various components of the system, and monitoring traffic activity. The toll fee system 600A expedites the toll fee process and completes the entire financial transaction at the time the vehicle operator such as, for example, a rental vehicle user returns the rental vehicle.

The toll fee system 600A maintains records of all toll transactions for all transponders 300 having valid toll rental entity accounts. These records are maintained and formatted for real-time or near real-time transmission to various elements within the toll fee system 600A. The toll fee system 600A includes a toll authority 502, a toll rental entity 504, and a third party entity 506. The toll authority 502 includes a plurality of toll gates 508 which are equipped with transponder reader units. The toll authority 502 further includes a processor 512 and a communications link 513 for bi-directional data communications with the toll rental entity 504. The processor 512 may be, for example, a conventional microcomputer or minicomputer, depending upon the size and the data-handling requirements of the toll fee system 600A. The processor 512 is interconnected to the transponder reader units 508 and a database 514. The processor 512 gathers toll fee tracking data from the transponder reader units 508 and stores the data into the database 514. The data is structured and transferred to the toll rental entity 504 using, for example, SOAP/XML. The database can be, for example, an Oracle™ database, a MS Access™ database, MS SQL, IBM DB2, and the like. The toll fee tracking data may include, for example, vehicle-class-identifiers, transaction time, transaction date, lane traffic activity information, transponder identification number, toll gate identification, vehicle travel direction and the amount of toll charged to the user. For simplicity, only one processor 512 and one database 514 is shown, however, a plurality of processors and databases may be employed by the toll authority 502.

The toll fee system 600A further includes a toll rental entity 504. The toll rental entity 504 acts as a communication channel between the toll authority 502 and the third party entity 506 for forwarding data from the toll authority 502 to the third party entity 506 in a real-time or near real-time fashion. The toll rental entity 504 may be, for example, a server capable of performing the various tasks which will be described later with respect to FIG. 7. The toll rental entity 504 includes a toll authority interface 516, a toll rental entity database 518, and a third party entity interface 520. The components 516, 518, and 520 as illustrated are for exemplary purposes. A detailed illustration of the various components and their functions will be shown and described later with respect to FIG. 7. The toll authority interface 516 may be, for example, a processor similar to the one disclosed earlier. The toll authority interface 516 is interconnected to the toll rental entity database 518 which in turn is connected to the third party entity interface 520. The toll authority interface 516 is adapted to send a request message to the processor 512 on the communications link 513. The request message is transmitted from the toll authority interface 516 to the processor 512 to obtain toll fee tracking data. For example, the request message may be transmitted at some predefined regular interval (e.g., one every two minutes) or continuously in real-time or near real-time. The processor 512 receives the request from the toll authority interface 516 and grants permission for the data to be pulled by the toll authority interface 516 residing within the toll rental entity 504. The data pulled by the toll rental entity 504 is stored in a data storage device such as, for example, a database 518 of the toll rental entity 504. The database can be, for example, an Oracle™ database, a MS Access™ database, MS SQL, IBM DB2, and the like. The toll authority interface 516 is also adapted to receive data from the toll authority 502 and convert the data into a format which is compatible for storage into the toll rental entity database 518.

The toll fee system 600A further includes a third party entity 506. The third party entity 506 includes a rental point-of-sale (POS) system 522, a customer invoice unit 524, and a third party entity processor 526. The third party entity interface 520 accesses the data from the database 518 and transmits the data to the third party entity POS system 522 within the third party entity 506. The data is then provided to the customer through a customer invoice unit 524 where the customer is charged the fee corresponding to the toll usage along with any relevant service charges and/or taxes. The customer invoice unit 524 may be, for example, a computer having printing capabilities. The customer invoice may be, for example, a printed invoice, an invoice which may be electronically transmitted to the customer, or the like. The rental authority processor 526 may also send a request message to the third party entity interface 520 requesting specific data corresponding to a particular customer or data relating to a particular time period. This data is transmitted to the rental POS 522 from the third party entity interface 520.

Figure 6B:
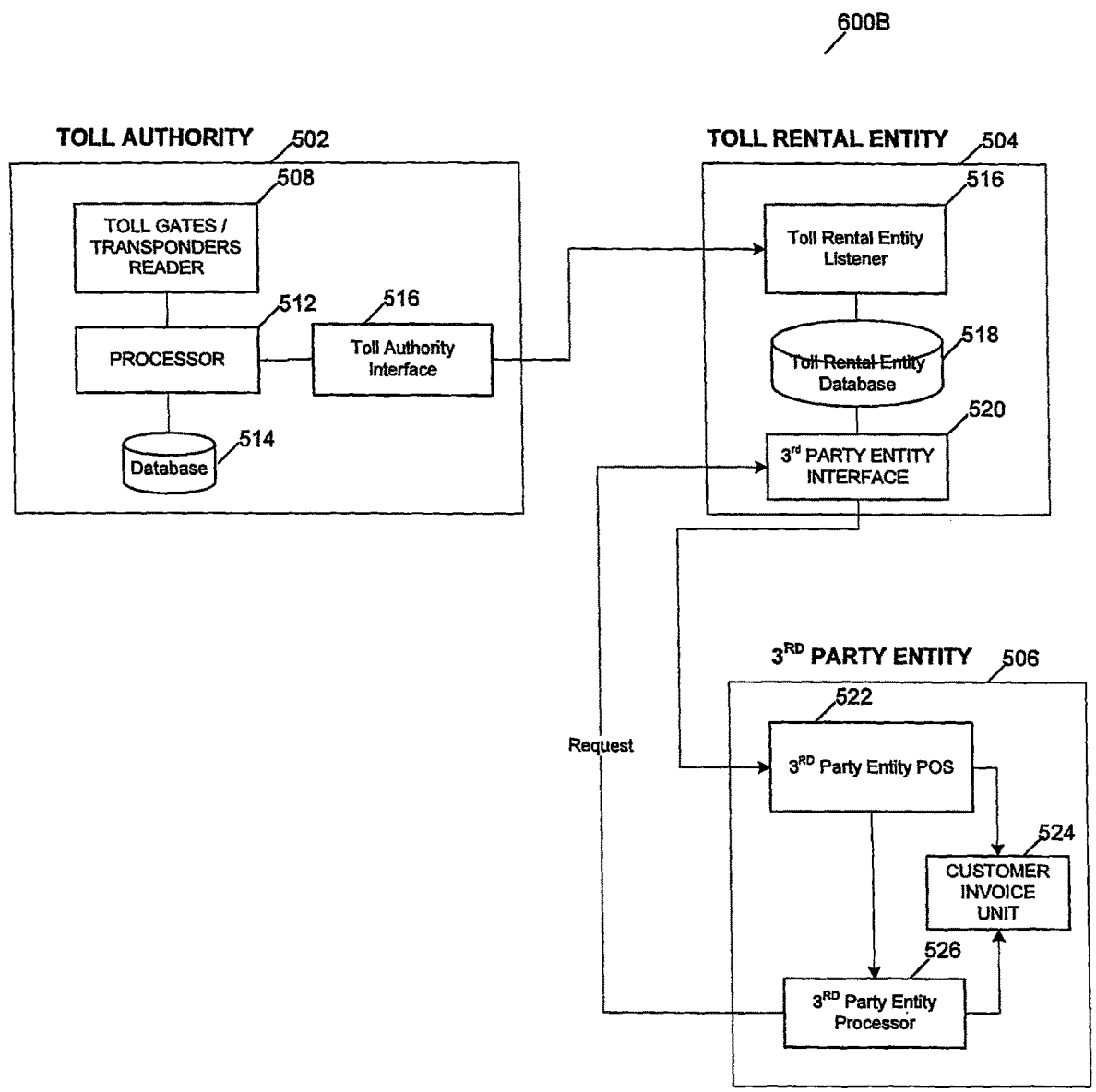
FIG. 6B illustrates a detailed block diagram of the toll fee system in accordance with an alternate embodiment of the present invention.

FIG. 6B illustrates a detailed block diagram of a toll fee system 600B in accordance with an alternate embodiment of the present invention. In this embodiment, the toll authority interface 516 resides within the toll authority 502. The toll authority interface 516 interfaces with a toll rental entity listener 517 within the toll rental entity 504. The toll rental entity listener 517 is adapted to receive data from the toll authority interface 516 and convert the data into a format which is compatible for storage into the toll rental entity database 518. In this embodiment, there is no need to send a request message from the toll rental entity 504 to obtain the data. The toll fee tracking data is periodically or continuously pushed from the toll authority interface 516 to the toll rental entity listener 517.

Figure 7:
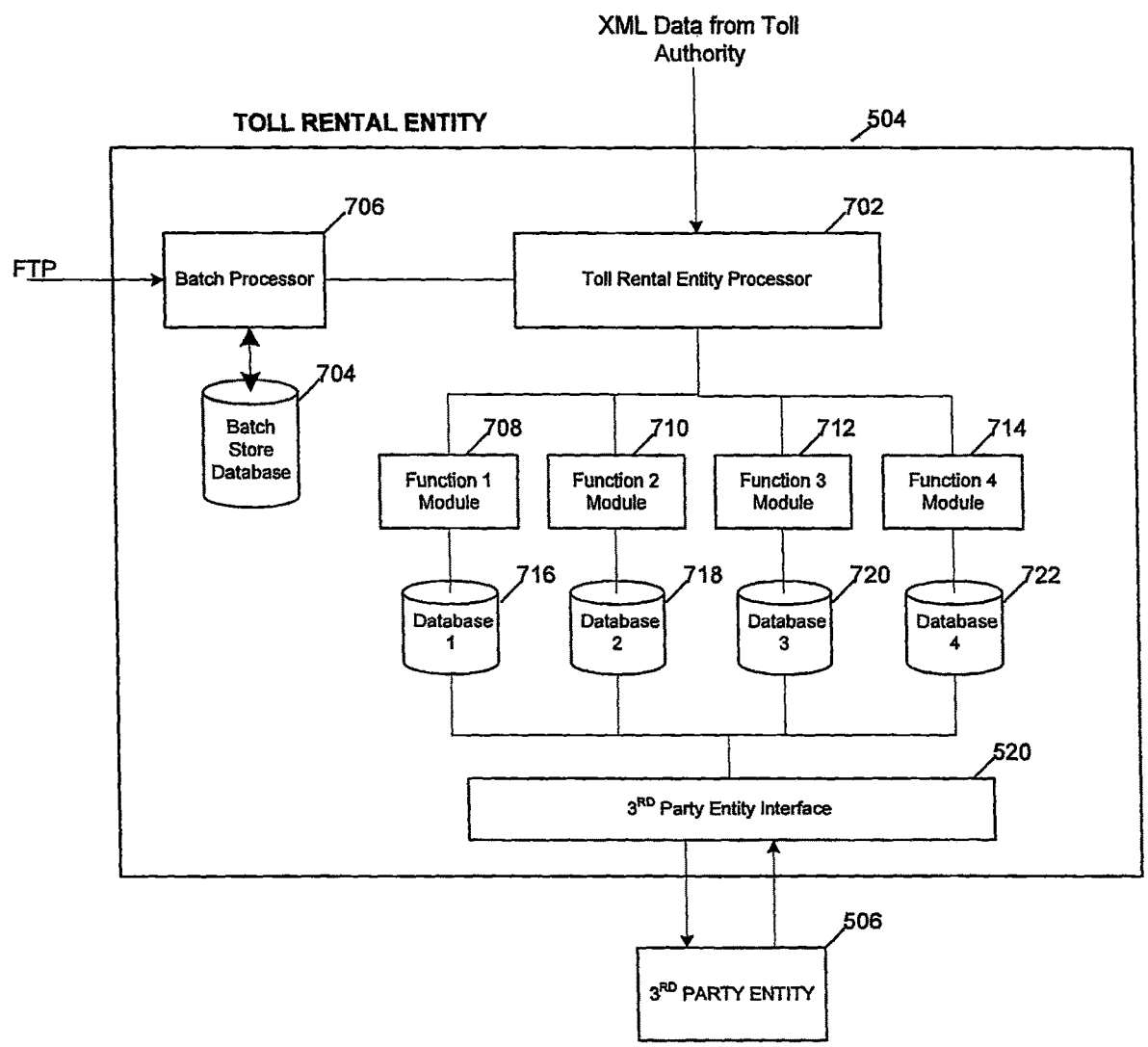
FIG. 7 illustrates a block diagram of a portion of the toll fee system of the present invention.

FIG. 7 illustrates a detailed block diagram of the toll rental entity 504 of the toll fee system of FIGS. 6A and 6B. The toll rental entity 504 may be, for example, a server for performing data analysis and data dissemination. The toll rental entity server 504 may include a plurality of processors such as, for example, a toll rental entity processor 702 and a batch processor 706. The processors 702 and 706 may be, for example, software systems or software components. In an embodiment of the present invention, the toll rental entity processor 702 is adapted to receive toll data from the toll authority 502 at some predefined regular intervals (e.g., every two minutes). In an embodiment, data transmission between the toll authority 502 and the toll rental entity server 504 may take place using, for example, XML, or any language specific formats. In another embodiment, data transmission between the toll authority 502 and the toll rental entity server 504 may take place using connection oriented or connection less communication protocols such as, for example, HTTP, TCP/IP, FTP etc.

The toll data is received by the toll rental entity processor 702. The toll rental entity processor 702 is adapted to analyze and disseminate the toll data and forward a request to at least one of the plurality of function modules 708, 710, 712, and 714. The request may be, for example, analyzing the toll data associated with a particular transponder and calculating an amount to be charged to a customer associated with the particular transponder. This function may be performed by, for example, function module 1708. The request may also include, for example, maintaining and updating toll rental entity accounts. This function may be performed by, for example, function module 710. The request may also include, for example, bill handling for updating charges associated with a particular transponder 300. This function may be performed by, for example, function module 712. Other functions may also be performed by the function modules 798, 710, 712, and 714 which may include, for example, payment handling, error handling, and the like. The plurality of function modules 708, 710, 712, and 714 are associated with a plurality of databases 716, 718, 720, and 722, respectively. The databases 716, 718, 720, and 722 are adapted to store data calculated by the function modules 708, 710, 712, and 714. The databases are connected to a third party entity interface 520 which is adapted to transmit information to the third party entity 506. The databases 716, 718, 720 and 722 may be, for example, Oracle™ databases, MS Access™ databases, MS SQL, IBM DB2, and the like. The transmission of data from the toll authority 502, the toll rental entity server 504, and the third part authority 506 takes place in a real-time or near real-time fashion. In an alternate embodiment of the present invention, the batch processor 706 is adapted to receive the toll data from the toll authority using connection less communications protocols such as, for example FTP. The toll data is received by the batch processor 706 at some predefined regular intervals (e.g., every hour). The toll data is transferred from the batch processor to the toll rental entity processor 702 for analysis and dissemination as disclosed earlier.

Figure 8:
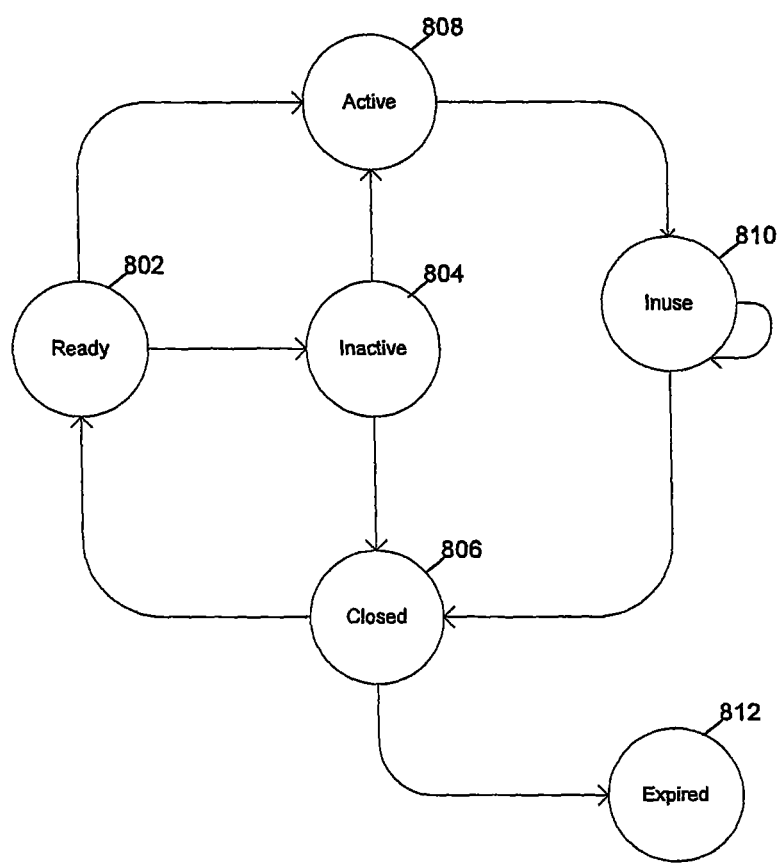
FIG. 8 illustrates a status diagram of a toll fee tracking device installed in each vehicle.

FIG. 8 illustrates a status diagram of the RFID transponder 300 as illustrated in FIG. 3. The transponder 300 is in a ready state 802 when a vehicle is ready to be rented to a customer. The ready state 802 indicates that the transponder 300 has already been assigned to a particular vehicle being operated by, for example, a rental vehicle user.

When the customer rents the rental vehicle from the third party entity 506, the customer has the option of accepting the automatic toll payment service provided by the toll rental entity 504. If the customer denies the automatic toll payment service, the transponder 300 goes into an inactive state 804. The transponder 300 remains in the inactive state 804 until the customer returns the car to the third party entity 506 or the customer uses a toll gate of the toll authority 502. Upon using the toll gate, the transponder 300 goes into an active state 808. Once the customer returns the car to the third party entity 506, the transponder 300 enters in a closed state 806 after which the status of the transponder will be changed for another customer.

However, if the customer accepts the automatic toll payment service, the transponder 300 goes into a ready state 802. When the customer uses the toll service for the first time, the system applies a minimum service charge and the status of the transponder 300 is changed to an active 808 state followed by the transponder 300 being changed to an in-use state 810.

In a situation when the transponder 300 is inactive and the customer uses the automatic toll payment service, the system applies a minimum service charge and updates the status of the transponder to active state 808 and in-use state 810, respectively.

When the customer returns the car to the third party entity 506, the third party entity 506 obtains transaction details of the transponder 300 using the toll rental entity listener 517 within the toll rental entity 504. Once the account is billed, the status of the transponder is changed to closed state 806. The closed state 806 indicates that the rental vehicle has been returned to the third party entity and the vehicle operator has been charged for the services utilized. Now the transponder 300 is ready to be reassigned. If for some reason the transponder 300 is malfunctioning, the transponder 300 returns to the closed state 806 followed by the transponder 300 going into an expired state 812.

Figure 9:
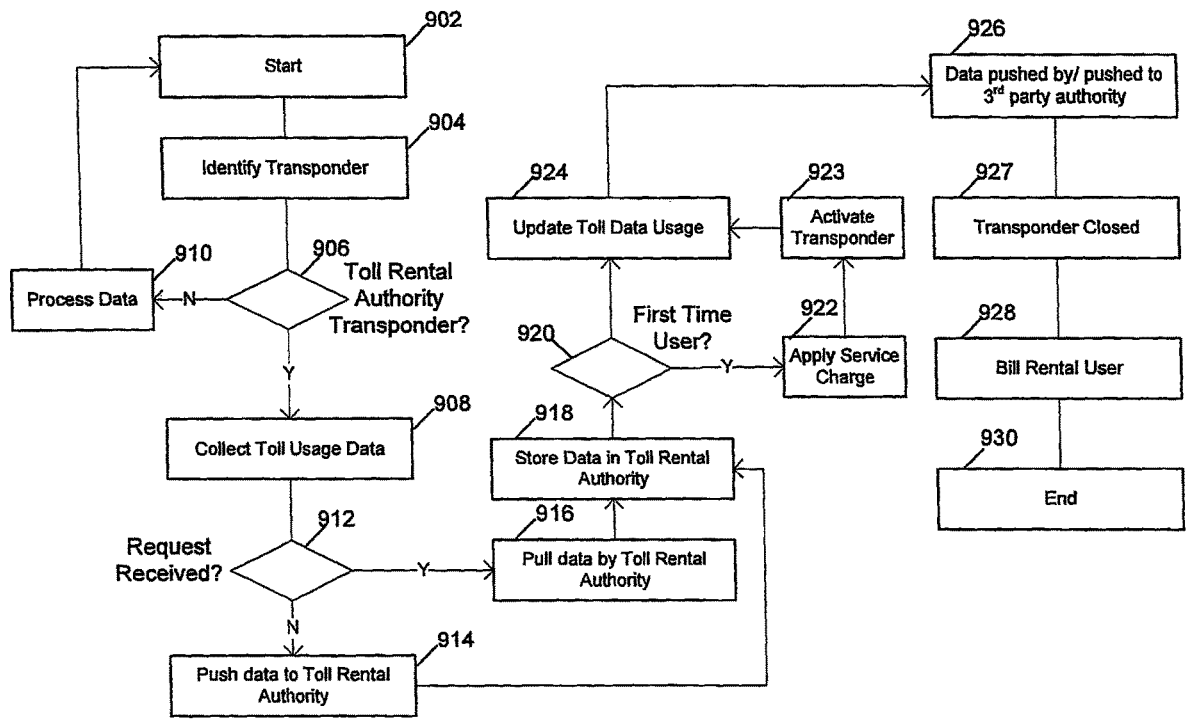
FIG. 9 illustrates a process flow diagram in accordance with the present invention.

FIG. 9 illustrates in detail a process flow 900 in accordance with the present invention. Although steps of the flow 900 are depicted in a particular sequence, it will be appreciated by persons of ordinary skill in the art that certain steps of the process need not necessarily follow a strict sequence but can be rearranged and/or performed simultaneously. The flow starts at step 902. At step 904, transponder data is read by the transponder readers 508 within the toll authority 502. The data may be, for example, vehicle-class-identifiers, transaction time, transaction date, lane traffic activity information, transponder identification number, toll gate identification, vehicle travel direction and the amount of toll usage to the user. At step 906, it is determined if the transponder identification data corresponds to the transponder identification data associated with the toll rental entity transponder. If it is determined that the transponder identification data does not corresponds to the transponder identification data associated with a toll rental entity transponder, the flow proceeds to step 910. At step 910, the data is processed by the toll authority 502 and the flow returns to step 902.

However, if it is determined at step 906 that the transponder identification data corresponds to the transponder identification data associated with the toll rental entity transponder, the process is continued at step 908. At step 908, the data is collected at a database 514 within the toll authority 502.

At step 912, it is determined if a request to share the data has been received by the processor 512 of the toll authority 502. The request may be sent by the toll authority interface 516 residing within the toll rental entity 504. The request may be, for example, a request message for allowing data to be pulled by the toll rental entity 504. For example, the request message may be transmitted at some predefined regular interval (e.g., one every two minutes) or continuously in real-time or near real-time. If it is determined that a request has been received by the processor 512 within the toll authority 502, the process is continued at step 916. At step 916, the data is pulled by the toll rental entity 504 and the process is continued at step 918. However, if it is determined at step 912 that a request has not been received, the process continues at step 914. At step 914, the toll authority pushes the data to the toll rental entity and the process is continued at step 918. At step 918, the data from steps 914 and 916 is stored in a database 518 within the toll rental entity 520.

At step 920, it is determined if a particular transponder associated with a user 300 is being used for the first time. If it is determined that the transponder is being used for the first time, the flow continues at step 922. At step 922, the user is charged a service fee and the process continues at step 923. At step 932, the transponder 300 is activated and the process continues at step 924. However, if it is determined at step 920 that the particular transponder 300 has been used before, the process continues at step 924. At step 924, the toll data usage is updated by processors within the toll rental entity 504. The process is continued at step 926 where the data is pushed from the toll rental entity 504 to the third party entity 506. At step 927, the transponder 300 is closed for further transaction until it is reassigned. At step 928, the user is provided with an invoice with charges related to the toll usage along with the charges associated with the use of the third party entity services such as, for example, charges related to vehicle rental. The process ends at step 930. The data transmission between the toll authority 502, the toll rental entity 504, and the third party entity 506 occurs at some predefined regular interval (e.g., one every two minutes) or continuously in real-time or near real-time.

It should be emphasized that the terms "comprise", "comprises", and "comprising", when used herein, are taken to specify the presence of stated features, integers, steps, or components, but do not preclude the presence or addition of one or more other features, integers, steps, components or groups thereof.

The previous Detailed Description is of embodiment(s) of the invention. The scope of the invention should not necessarily be limited by this Description. The scope of the invention is instead defined by the following claims and the equivalents thereof.

What is claimed is:
1. A toll processing system comprising:
a toll fee tracking device configured to enter a ready state responsive to a customer of a vehicle rental entity accepting, via a vehicle rental entity processor of the vehicle rental entity, an automatic toll payment service provided by an intermediate entity for use of a vehicle of the vehicle rental entity, the toll fee tracking device configured to enter an inactive state responsive to the customer of the vehicle rental entity denying, via the vehicle rental entity processor, the automatic toll payment service; and
an intermediate server to communicate data between a toll authority and the vehicle rental entity, the intermediate server including:
a first interface to communicate with a toll authority processor of the toll authority;
a data storage device configured to store at least one database;
a second interface to communicate with the vehicle rental entity processor; and
at least one intermediate processor configured to:
obtain toll fee tracking data from the toll authority processor via the first interface;
store the toll fee tracking data in the at least one database;
analyze the toll fee tracking data to determine whether toll usage corresponding to the toll fee tracking data was accrued by the vehicle of the vehicle rental entity for which the customer accepted, based on the toll fee tracking device, the automatic toll payment service provided by the intermediate entity;

push, to the vehicle rental entity processor via the second interface, the analyzed toll fee tracking data so as to be available upon return of the vehicle to the vehicle rental entity; and enter the toll fee tracking device into a closed state upon a detection by the vehicle rental entity processor of the return of the vehicle to the vehicle rental entity.

2. The system of claim 1, wherein the at least one intermediate processor is configured to determine charges to be paid by the customer, the charges comprising charges for at least one of:
toll usage; and
vehicle rental entity services usage.

3. The system of claim 1, wherein the toll fee tracking data is obtained at least one of:
at predefined regular intervals;
continuously in real-time; and
in near real-time.

4. The system of claim 1, wherein the customer is associated with a toll fee tracking device, which comprises a radio frequency integrated device (RFID) transponder.

5. The system of claim 4, wherein the RFID transponder comprises transponder identification data.

6. The system of claim 1, wherein the intermediate server comprises a stand-alone unit.

7. The system of claim 1, wherein the intermediate server is configured to charge the customer a service fee if the customer did not accept, based on the renter data, the automatic toll payment service.

8. The system of claim 1, wherein the intermediate server is integrated within the toll authority.

9. A toll fee tracking system comprising:
a toll fee tracking device configured to enter a ready state responsive to a customer of a vehicle rental entity accepting, via a vehicle rental entity processor of the vehicle rental entity, an automatic toll payment service provided by an intermediate entity for use of a vehicle of the vehicle rental entity, the toll fee tracking device configured to enter an inactive state responsive to the customer of the vehicle rental entity denying, via the vehicle rental entity processor, the automatic toll payment service;
an intermediate server adapted to communicate with a toll authority processor of a toll authority and the vehicle rental entity processor, the intermediate server configured to:
receive, from the toll authority processor, collected data associated with toll authority usage by the vehicle;
store the collected data in at least one database;
analyze the collected data to determine whether toll usage corresponding to the collected data was accrued by the vehicle of the vehicle rental entity for which the renter of the vehicle accepted, based on the renter data, the automatic toll payment service provided by the intermediate entity;
push at least some of the collected data to the vehicle rental entity processor so as to be available upon return of the vehicle to the vehicle rental entity; and
enter the toll fee tracking device into a closed state upon a detection by the vehicle rental entity processor of the return of the vehicle to the vehicle rental entity.

10. The system of claim 9, wherein said toll authority comprises:
toll gates equipped with toll fee tracking device readers;
at least one processor, wherein said at least one processor includes a bi-directional data communications link; and
at least one database.

11. The system of claim 9, wherein said toll intermediate entity server comprises:
a toll authority interface adapted to communicate with said toll authority;
at least one database; and
a vehicle rental entity interface adapted to communicate with said vehicle rental entity.

12. The system of claim 9, wherein said vehicle rental entity comprises:
at least one rental point-of-sale (POS) system; and
at least one invoice unit.

13. The system of claim 9, wherein said intermediate server comprises a stand-alone unit.

14. The system of claim 9, wherein the intermediate server is configured to forward the at least some of the collected data to the vehicle rental entity processor in time for the vehicle rental entity to charge the customer for toll usage at a time at which the vehicle is returned to the vehicle rental entity.

15. The system of claim 9, wherein communication between said toll authority processor and said intermediate server comprises pulling said collected data from said toll authority processor.

16. The system of claim 9, wherein communication between said toll authority processor and said intermediate server comprises pushing said collected data to said intermediate server.

17. The system of claim 16, wherein said communication between said toll authority processor and said intermediate server occurs in real-time.

18. The system of claim 9, wherein communication between said toll authority processor and said intermediate server occurs at predefined regular intervals.

19. The system of claim 9, wherein communication between said toll intermediate server and said vehicle rental entity processor comprises pushing said collected data to said vehicle rental entity processor.

20. The system of claim 19, wherein said communication between said intermediate entity and said vehicle rental entity occurs in real-time.

21. The system of claim 9, wherein said intermediate entity server is configured to charge the customer a service fee if the customer did not accept the automatic toll payment service.

22. The system of claim 9, wherein said collected data includes vehicle-class-identifiers, lane traffic activity, toll fee tracking device identification data, transaction time, transaction date, toll gate identification, vehicle travel direction, and toll fee data.

23. The system of claim 9, wherein at least one toll fee tracking device comprises a radio frequency integrated device (RFID) transponder.

24. The system of claim 23, wherein said RFID transponder comprises transponder identification data.

\* \* \* \* \*